Jan. 2, 1934.  M. HESELTINE  1,942,212
METHOD OF MERCHANDISING PRESERVED FRUITS
Filed Dec. 17, 1932
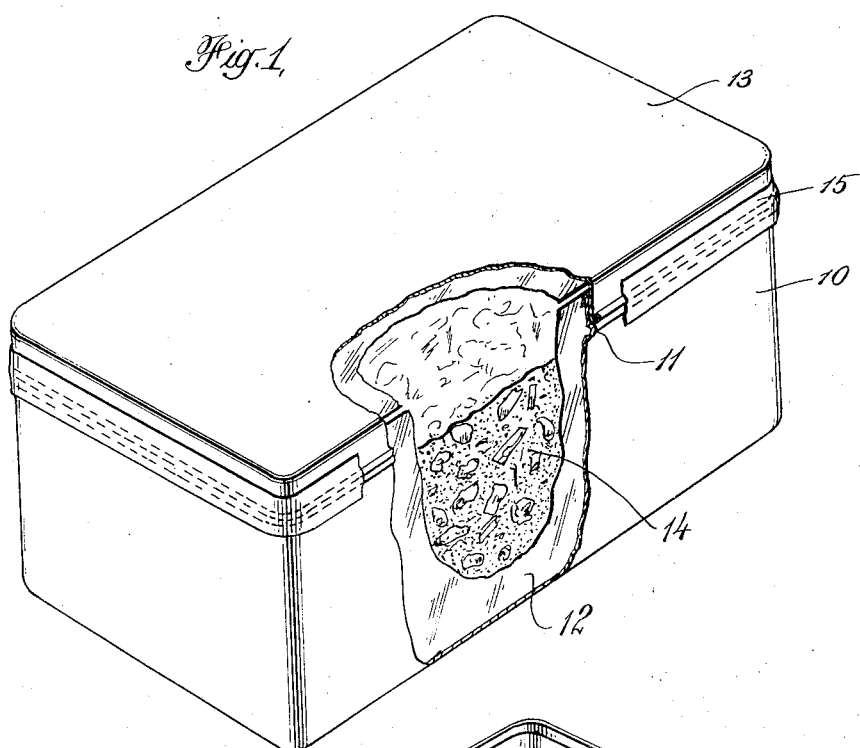
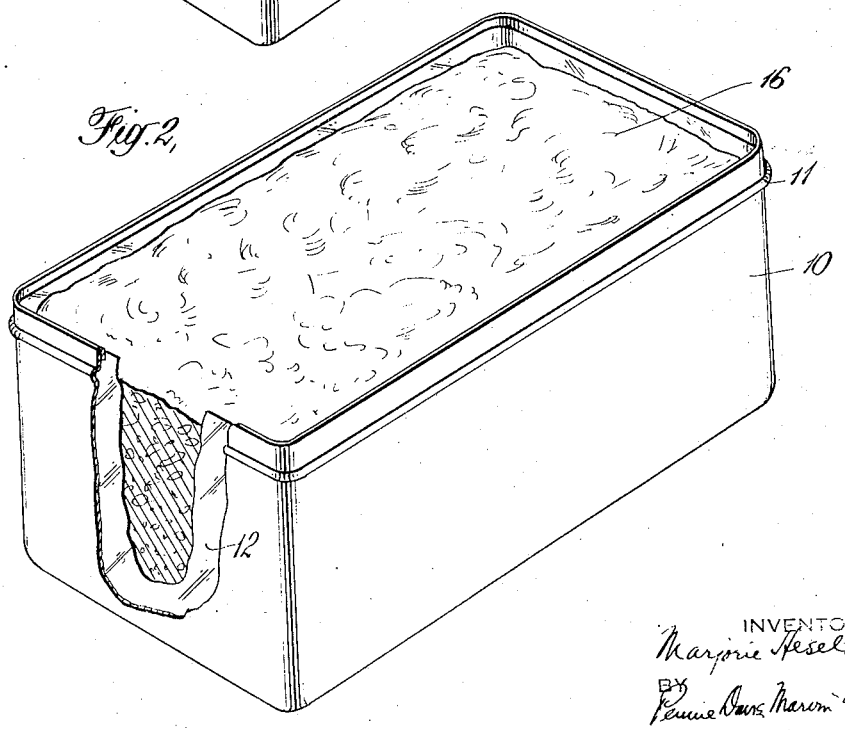
INVENTOR.
Marjorie Heseltine
BY Pennie Davis Marvin Edmonds
ATTORNEYS Patented Jan. 2, 1934

UNITED STATES PATENT OFFICE 1,942,212

METHOD OF MERCHANDISING PRESERVED FRUITS

Marjorie Heseltine, Jersey City, N. J., assignor to The Hills Brothers Company, New York, N. Y., a corporation of New York Application December 17, 1932
Serial No. 647,753

5 Claims. (Cl. 206—46)

This invention relates to the merchandising of dry materials for cakes, of which preserved fruit products, such as citron, dates, raisins, lemon and orange peel, and the like, are typical examples, and it is concerned more particularly with a novel method of preparing and distributing such products and a new package employed in practicing that method.

At the present time, preserved fruit products, which are probably most widely used in making cakes and other similar articles of food, are distributed in packages of different sizes and capacities, and when a housewife wishes to make a cake, such as a fruit cake, containing a large variety of different preserved fruits, she has to make purchases of many ingredients and usually cannot obtain packages containing the exact amounts desired. Shopping for these many different fruits is likely to be troublesome and it is always highly probable that quantities of the ingredients will be left over and wasted. Another difficulty encountered in making fruit cakes in the household is that of properly combining the ingredients to obtain the desired uniform distribution, as the cake batter ordinarily contains only a relatively small amount of flour and a considerably larger amount of the fruit. Because of the difficulties and expense mentioned, the making of fruit cakes at home, and particularly in small households, has been largely discontinued and the market for preserved fruits has greatly suffered in consequence.

The present invention is, accordingly, directed to the provision of a novel method of merchandising preserved fruits, which involves the preparation and distribution of the fruits in a form suitable for use in the production of a fruit cake with a minimum of labor and expense. According to this method, the dry ingredients of such a cake including the fruits are mixed together in proper proportions and are placed in containers having such qualities and of such construction that they may be used for both shipping and baking purposes. Metal containers are well suited for that purpose, although containers of other suitable materials may be used. The mixture of the ingredients is made in such a way that when a housewife wishes to make a cake, she obtains one of the new packages containing the dry cake ingredients, removes the contents, adds liquid and, in some cases, beats in an egg to produce a batter, and then places the batter in a suitable receptacle, for instance, the container itself, and bakes the batter in the usual way. Making a fruit cake, for example, is thus a simple, economical operation, which can be carried out without difficulty and with no waste, and the popularity of the new package indicates that this method of merchandising will restore the market for preserved fruits and also increase it to a marked extent.

For a better understanding of the invention, reference may be made to the accompanying drawing in which, Fig. 1 is a view in perspective of the new combined shipping and baking container with parts broken away to indicate the condition of the contents during shipment, and Fig. 2 is a similar view illustrating the use of the container in baking the cake.

In the practice of the new method, preserved fruits, for example, may be distributed in a mixture with other ingredients suitable for making various food products, but I prefer to supply fruit cake mixtures, since fruit cakes contain a relatively large proportion of fruits of many kinds. Different recipes may be followed as desired, and one which has proven highly successful in actual use is given below, the total quantity prepared in accordance with the recipe being sufficient for making twelve cakes, each weighing a little more than a pound:

| | |
|---|---|
| Flour | 2½ lbs. |
| Baking powder | 2 oz. |
| Salt | 1 oz. |
| Mixed spices | 1 oz. |
| Walnut pieces | 5 oz. |
| Pitted dates | 2½ lbs. |
| Seedless raisins | 2½ lbs. |
| Citron | 1¼ lbs. |
| Orange peel | 10 oz. |
| Lemon peel | 10 oz. |
| Glacé cherries | 5 oz. |
| Glacé pineapple | 5 oz. |
| Shortening | 1¼ lbs. |
| Brown sugar | 2 lbs. |

In making the mixture in accordance with the above recipe, the major part of the flour, together with the salt, spices, and baking powder, are separately weighed out, mixed by hand in a suitable vessel, and then sifted. The sugar is then weighed out and the lumps broken by hand. The sugar and sifted materials are then placed in a mechanical mixing device, which is operated for a short period such as five minutes in order to produce a thorough mixture of the various ingredients. The shortening which is preferably a hydrogenated fat, such as that commercially sold under the trade name of Clix, is now weighed out, placed in a vessel with the mixed ingredients previously mentioned and cut into the mass until no free fat may be detected on the fingers. The mixture is then ready to be combined with the fruits.

The dates which have been thoroughly steamed, are left in cold storage until they are firm and are then cut into pieces of the proper size and the quantity required by the recipe is weighed out. The cherries, pineapple slices, citron, and lemon and orange peel are also cut into pieces of the proper size and the desired quantities weighed out. Similarly, weighed quantities of walnuts and seedless raisins are likewise prepared, and these unit quantities are delivered to a table ready for mixing with the mixture of flour, spices, fat, etc., previously prepared. On the mixing table, the fruits are picked over to separate the pieces from one another and the nuts and raisins are also examined and the pieces of shell, stem and the like removed. A small quantity of flour is sifted over the dates and fruits and alternate small amounts of the fruit and batter material are built up in layers on the table and the mixing then completed by turning in by hand.

When the several ingredients have been properly mixed together, suitable quantities of the mixture are placed in suitable containers. I prefer to supply the mixture to the consumer in a container which may be used for baking the cake as well as for shipping the mixture. Such a combined shipping and baking container may take various forms, the container 10 illustrated in the drawing being preferred.

This container is generally rectangular in shape with rounded corners and it is provided with an outwardly formed bead 11 extending around it just below the top. The body of the container is lined with glassine paper 12 and the can is provided with a cover 13 which fits the can body tightly and, when in place, rests against the bead. A suitable quantity of the ingredient mixture 14 is now introduced into the can, the cans used commercially holding about 17½ oz. of the mixture. In filling the cans, care is taken at all times to obtain a uniform distribution of the dough ingredients and the fruit, the supply being continually turned in by the operative who directs his scoop toward the center of the pile at all times in order to keep mixing the mass. After the containers are filled, they may be sealed in any desired way as, for example, by applying a sealing strip 15 to each can in such fashion as to overlap the edge of the cover and the bead on the body of the can. While the contents of the can are not subject to rapid deterioration, the sealing keeps the contents in better condition and obviates all possibility of insects entering the can. Each can may be placed in a carton and the latter wrapped in cellophane or the like, an attractive package ready for distribution being produced in this manner. While I have described the container as being of generally rectangular shape and having a fitted cover, the mixture may, if desired, be distributed in an ordinary sanitary can. The can with the removable cover may be used more conveniently as a baking utensil and is, therefore, preferred.

In using the new package to make a cake, the housewife opens the can and places the contents in a bowl. She then stirs a small quantity of liquid, such as ⅓ cup of water, and an egg into the mass and thus produces a batter which is returned to the paper lined container. The container is placed in an oven and baked for the necessary length of time. Upon completion of the baking, the cake 16 substantially fills the can, as illustrated in Fig. 2, and it can be readily removed because the paper lining prevents it from sticking to the interior of the can.

Since the numerous ingredients of the cake are supplied to the housewife in the proper kinds and amounts and properly mixed together, the making of a cake from the contents of the new container is a simple operation requiring no skill whatever and involving no loss because of waste. Cakes produced in the manner described have been uniformly satisfactory and the new packages have had a wide sale with consequent distribution of large amounts of numerous kinds of preserved fruit products. The market for such products has thus been substantially extended by the new method of merchandising them.

While the recipe given above is that for a fruit cake, it is to be understood that the invention is not limited to any particular cake recipe and the package may contain the dry ingredients for any type of cake.

What I claim is:

1. A merchantable unit including a shipping container having such qualities as to constitute it at the same time a baking container, said shipping container enclosing a substantial portion of solid ingredients only and in such relative proportions as are required to produce a baked cake, said ingredients also being in such quantity as to promote the conversion thereof into a cake by baking after a suitable quantity of liquid ingredients, such as eggs and milk, have been added thereto.

2. A merchantable unit including a metal shipping container having the qualities of a baking container, a tight fitting metal cover therefor, said container enclosing a substantial portion of solid ingredients only and in such relative proportions as are required to produce a baked cake, said ingredients also being in such quantity as to promote the conversion thereof into a cake by baking after a suitable quantity of liquid ingredients, such as eggs and milk, have been added thereto.

3. A merchantable unit including a paper-lined shipping container having such qualities as to constitute it at the same time a baking container, said shipping container enclosing a substantial portion of the solid ingredients only of a fruit cake, said ingredients being in such relative proportions as are required to produce a baked fruit cake, and in such quantity as to promote the conversion thereof into a fruit cake by baking after a suitable quantity of liquid ingredients, such as eggs and milk, have been added thereto.

4. A merchantable unit including a shipping container having such qualities as to constitute it at the same time a baking container, said shipping container enclosing a substantial portion of the solid ingredients only of a fruit cake, said ingredients being in such relative proportions as are required to produce a baked fruit cake, the quantity of said solid ingredients within said container being sufficient when having added thereto a suitable quantity of liquid ingredients, such as eggs and milk, and baked, to produce a cake substantially filling said container.

5. A merchantable unit including a shipping container having such qualities as to constitute it at the same time a baking container, said shipping container enclosing a substantial portion of solid ingredients only of a fruit cake, said ingredients including flour, sugar, shortening, flavoring ingredients, nuts and preserved fruit products, the nuts and preserved fruit products being reduced to proper size and the ingredients being in such relative proportions as are required to produce a baked fruit cake, and in such quantity as to promote conversion thereof into a fruit cake by baking after a suitable quantity of liquid ingredients, such as eggs and milk, have been added thereto.

MARJORIE HESELTINE.